Nov. 10, 1931.  E. L. FICKETT ET AL  1,830,753
GEAR CUTTING MACHINE
Filed Feb. 23, 1929  15 Sheets-Sheet 1
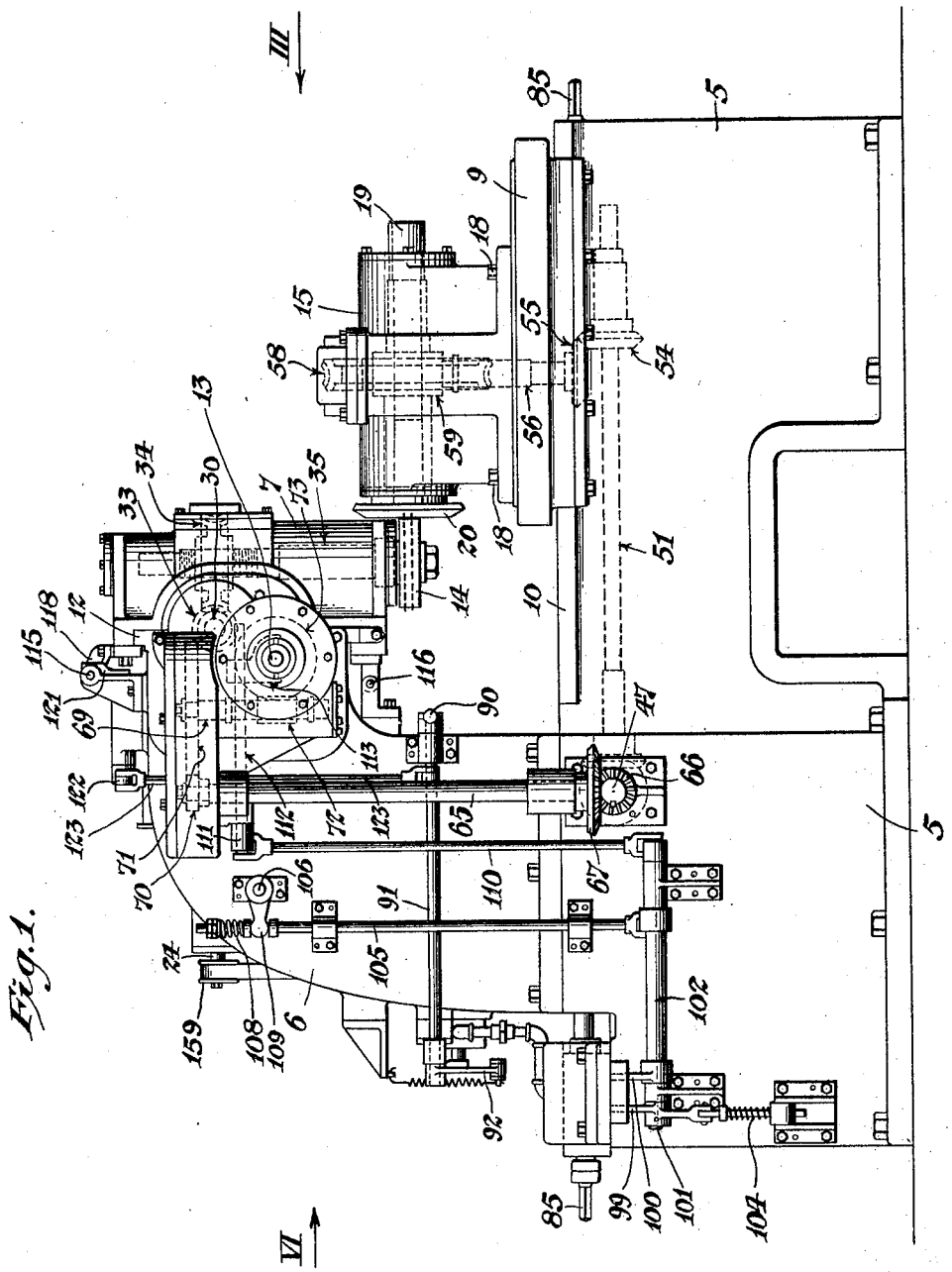
Inventors
Ernest L. Fickett, Linus E. Greene,
Vladimir Charushin, James S. Campbell
By their Attorney
Maurice R. Landis

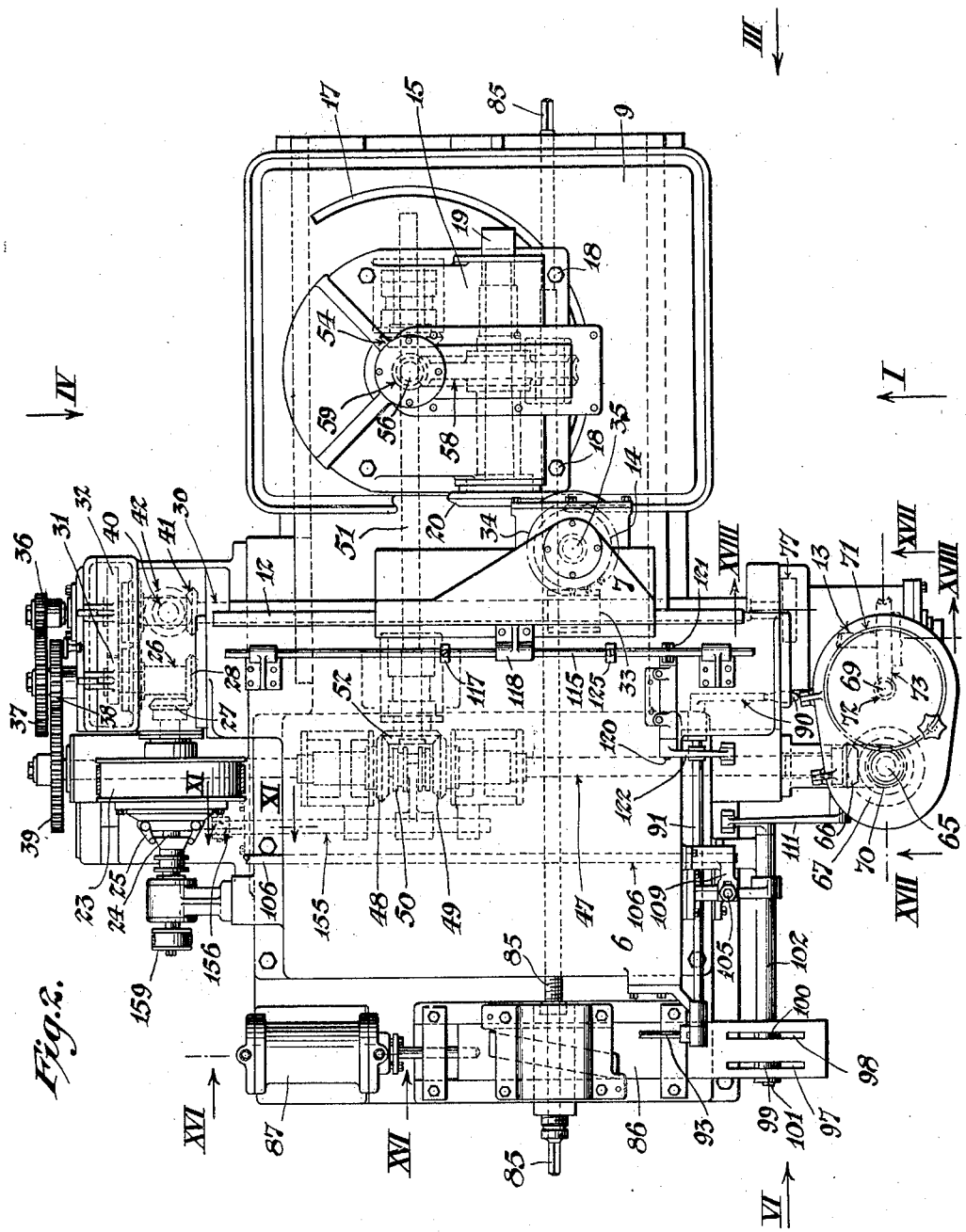

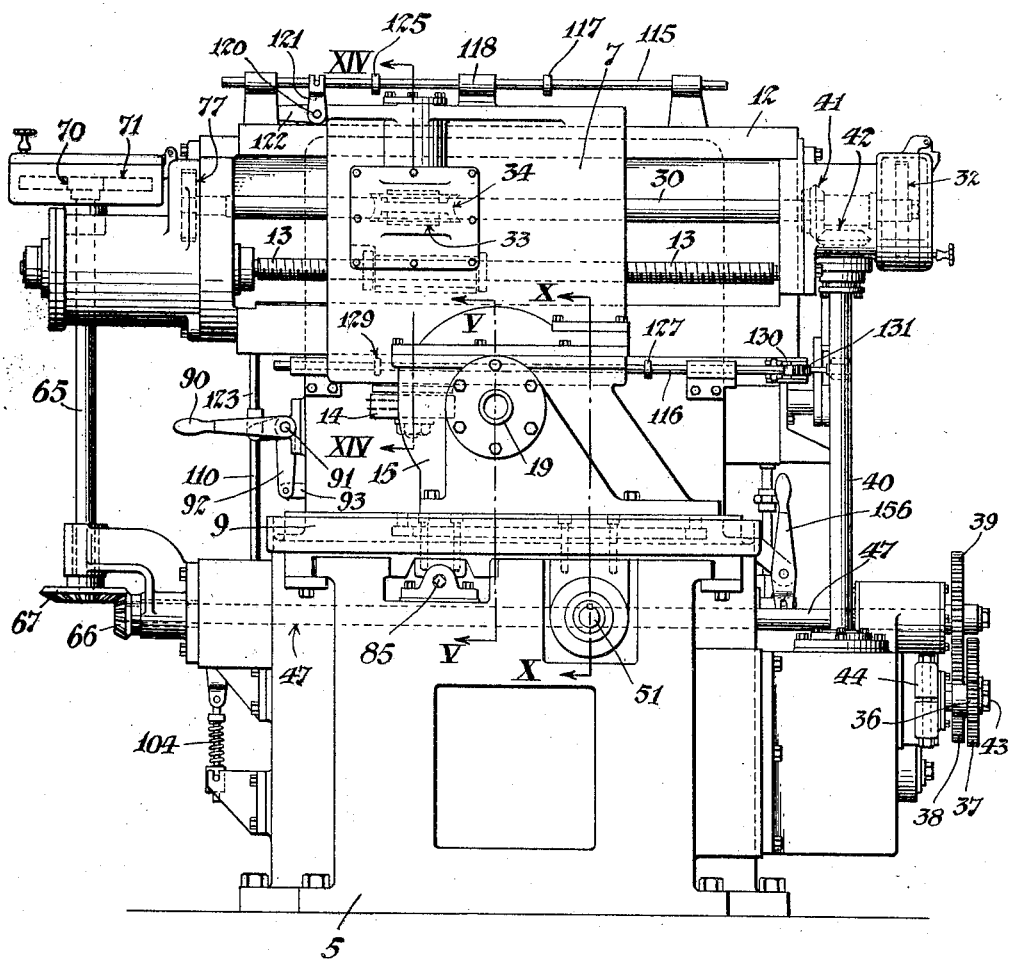

Nov. 10, 1931.  E. L. FICKETT ET AL  1,830,753
GEAR CUTTING MACHINE
Filed Feb. 23, 1929   15 Sheets-Sheet 4
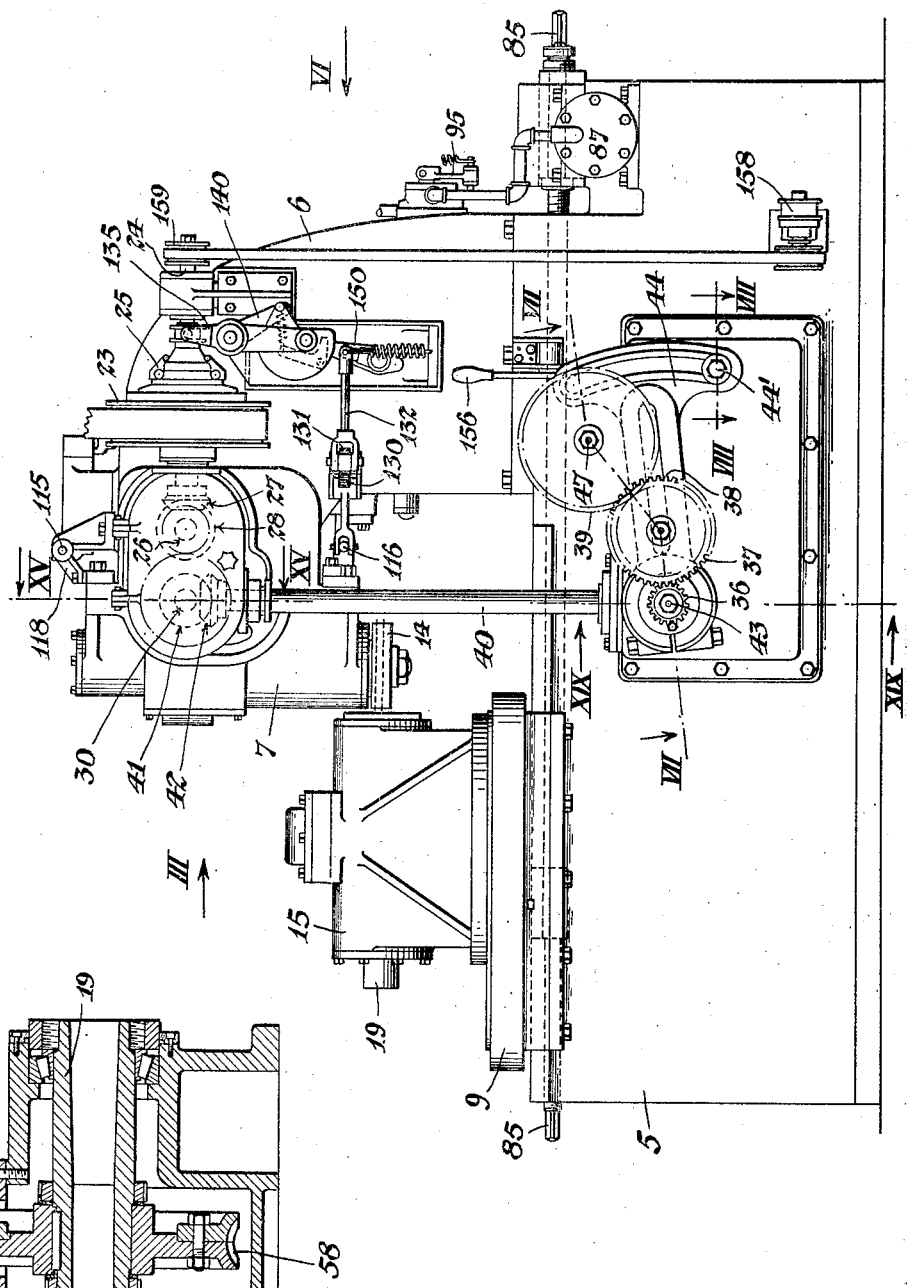
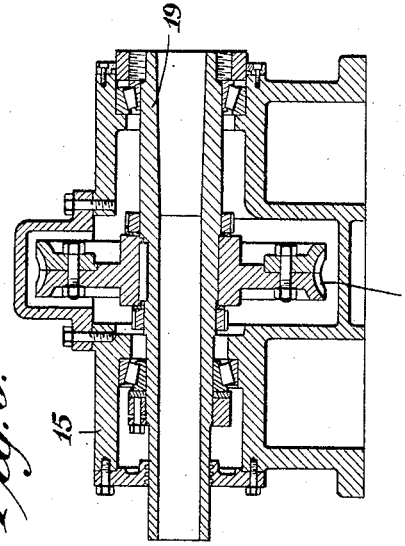
Inventors
Ernest L. Fickett, Linus E. Greene,
Vladimir Charushin, James S. Campbell
By their Attorney
Maurice B. Landers Nov. 10, 1931.  E. L. FICKETT ET AL  1,830,753
GEAR CUTTING MACHINE
Filed Feb. 23, 1929  15 Sheets-Sheet 5

Inventors
Ernest L. Fickett, Linus E. Greene,
Vladimir Charushin, James S. Campbell
By their Attorney

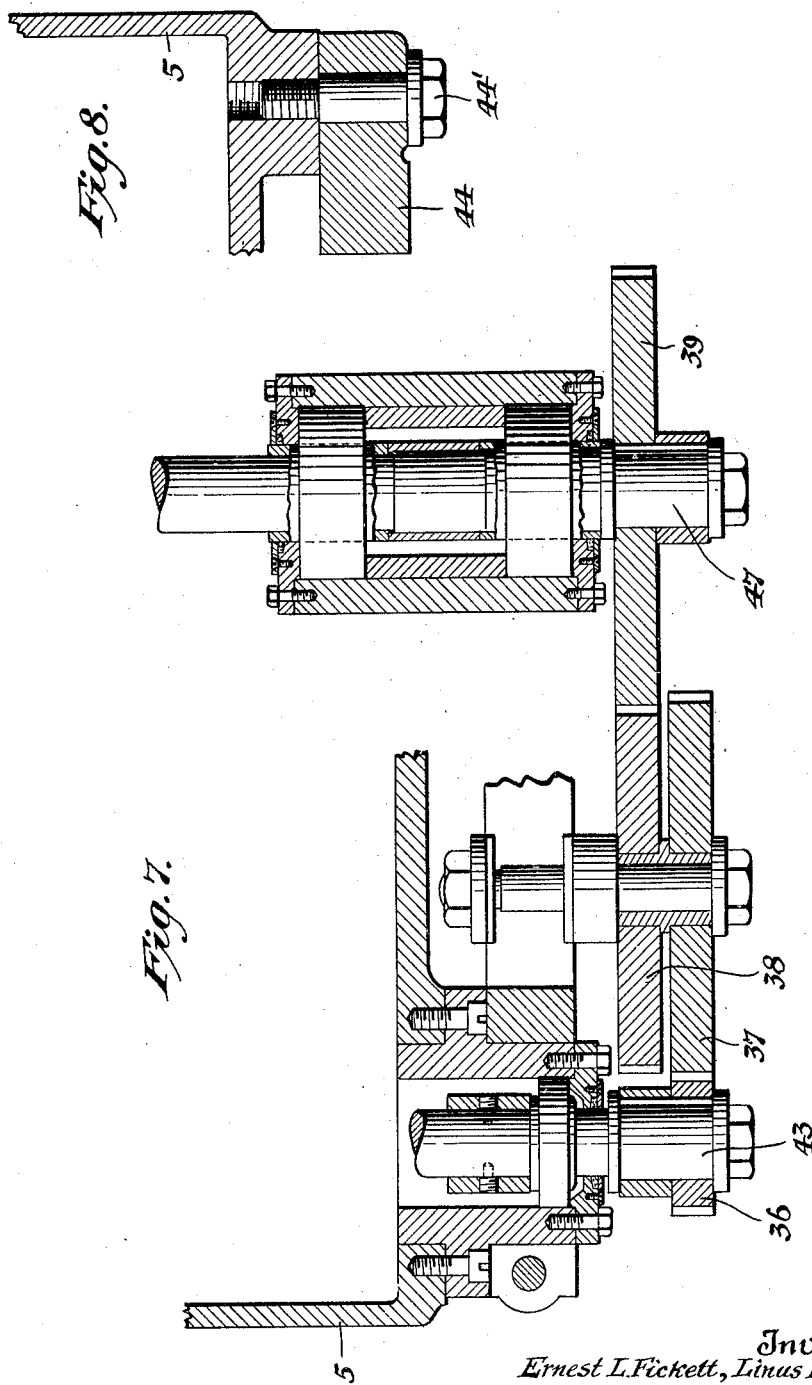

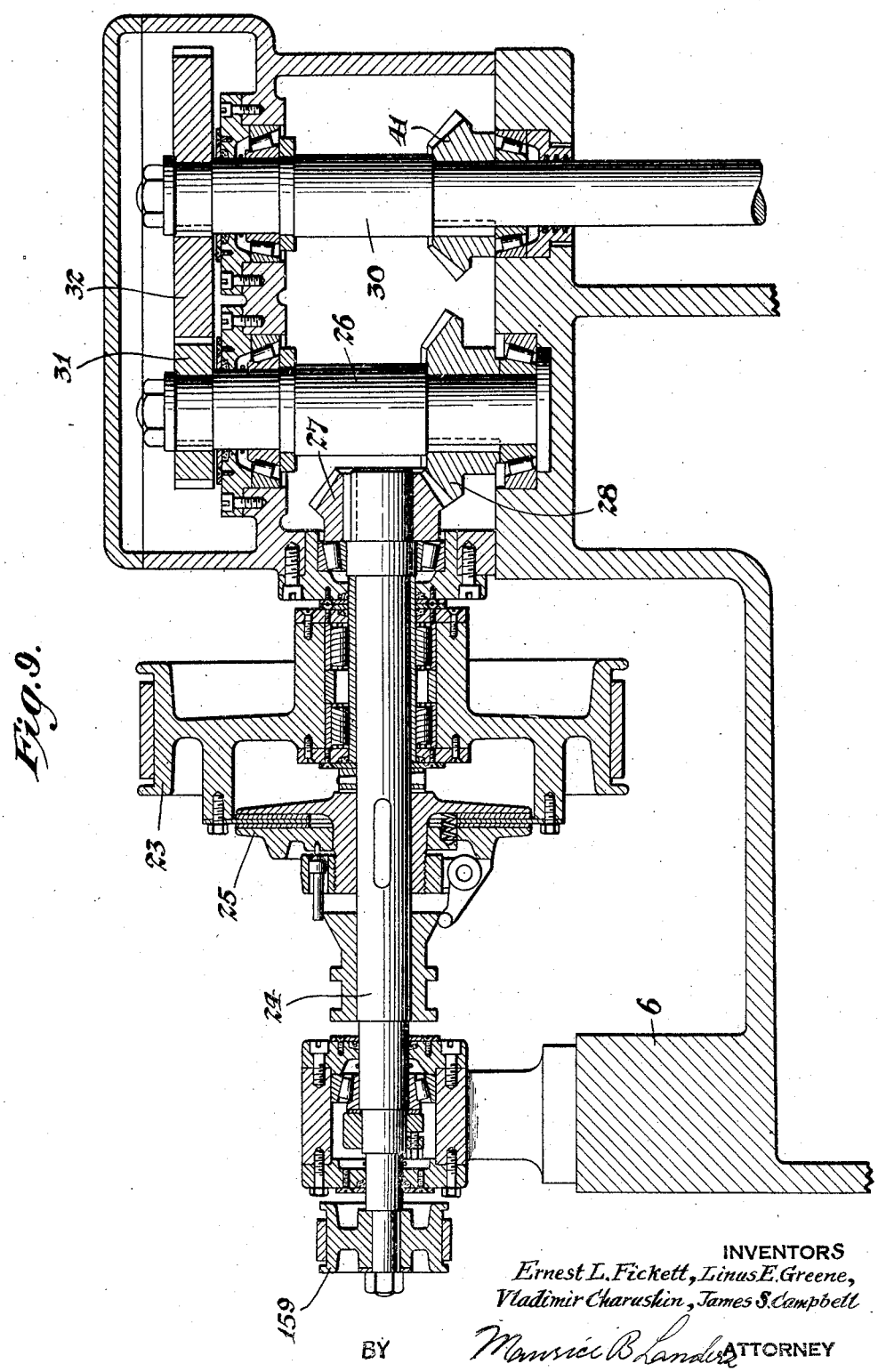

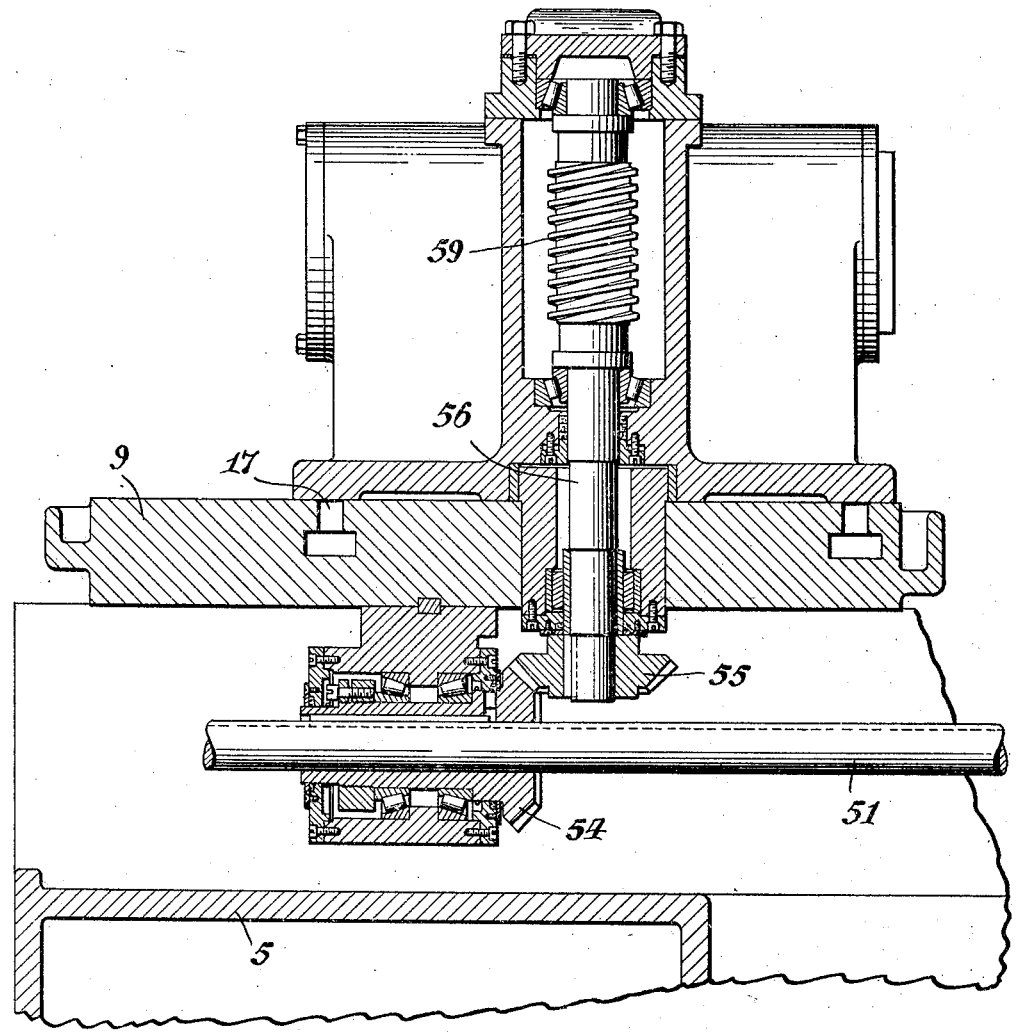

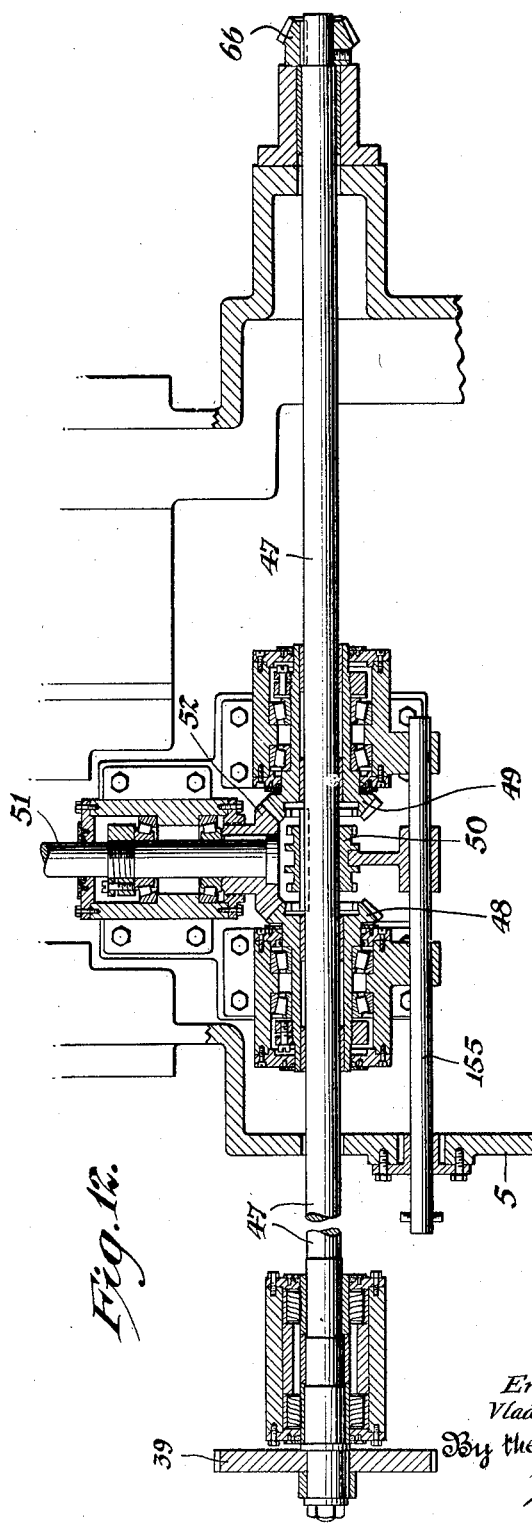

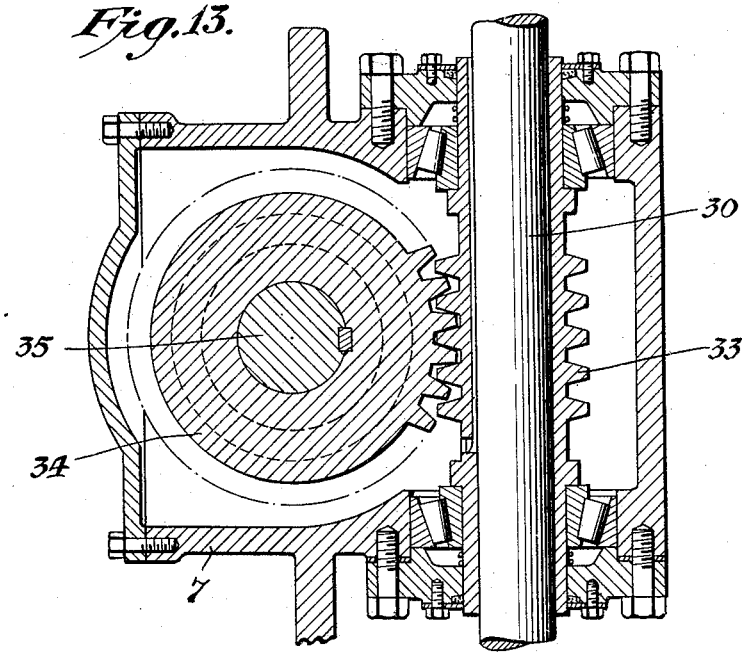
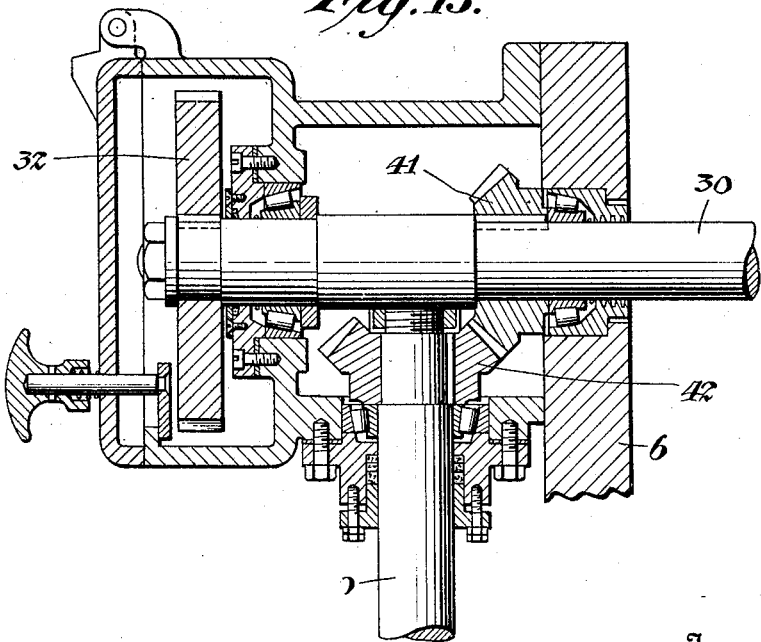

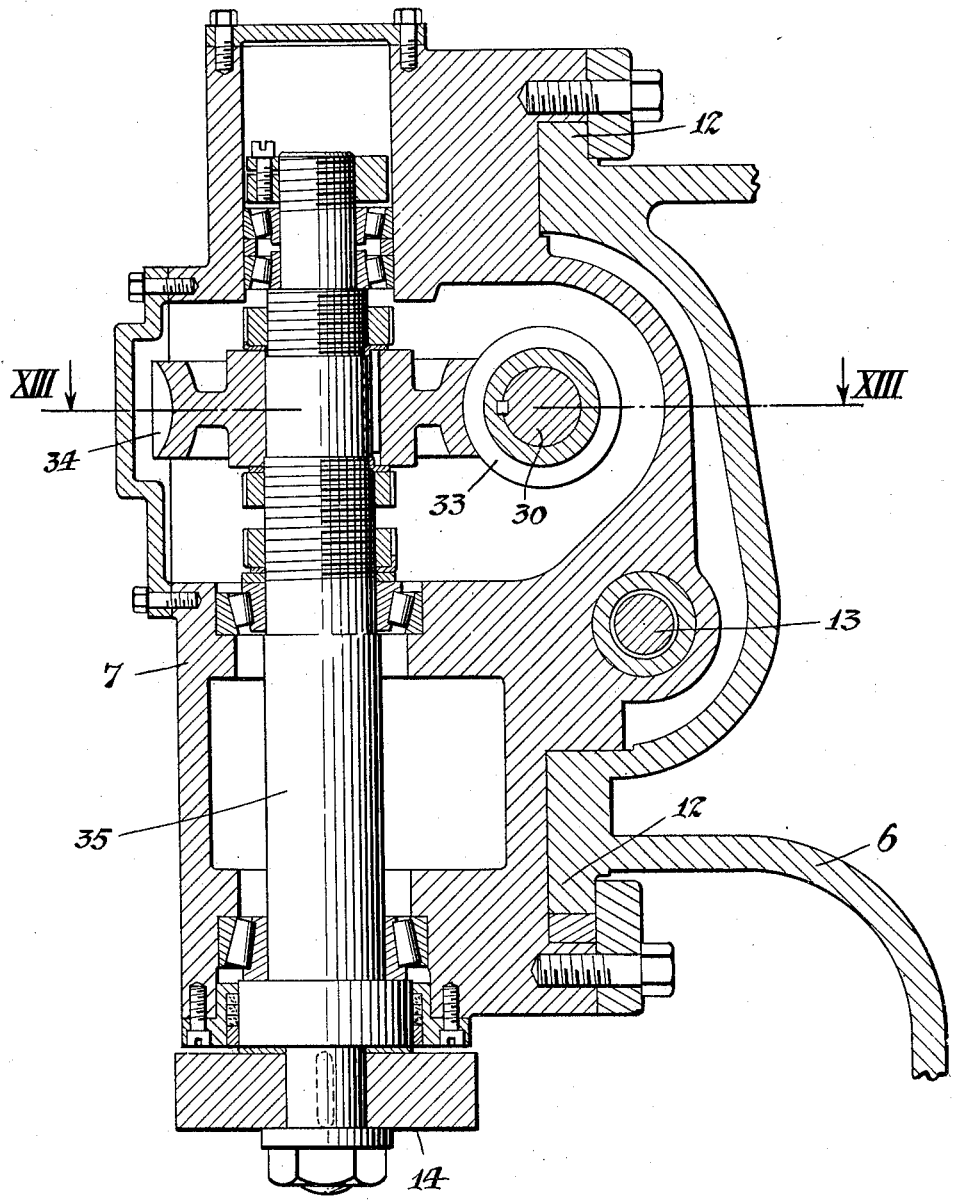

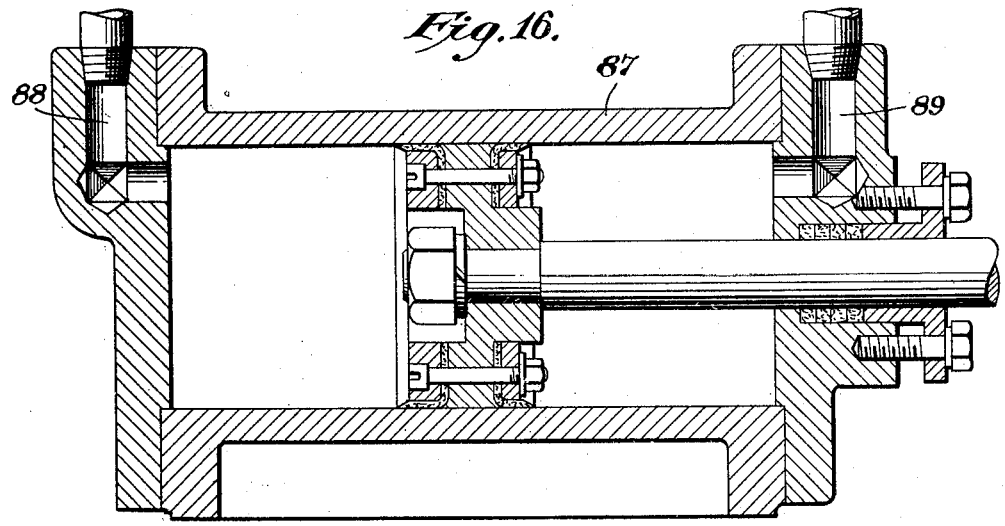
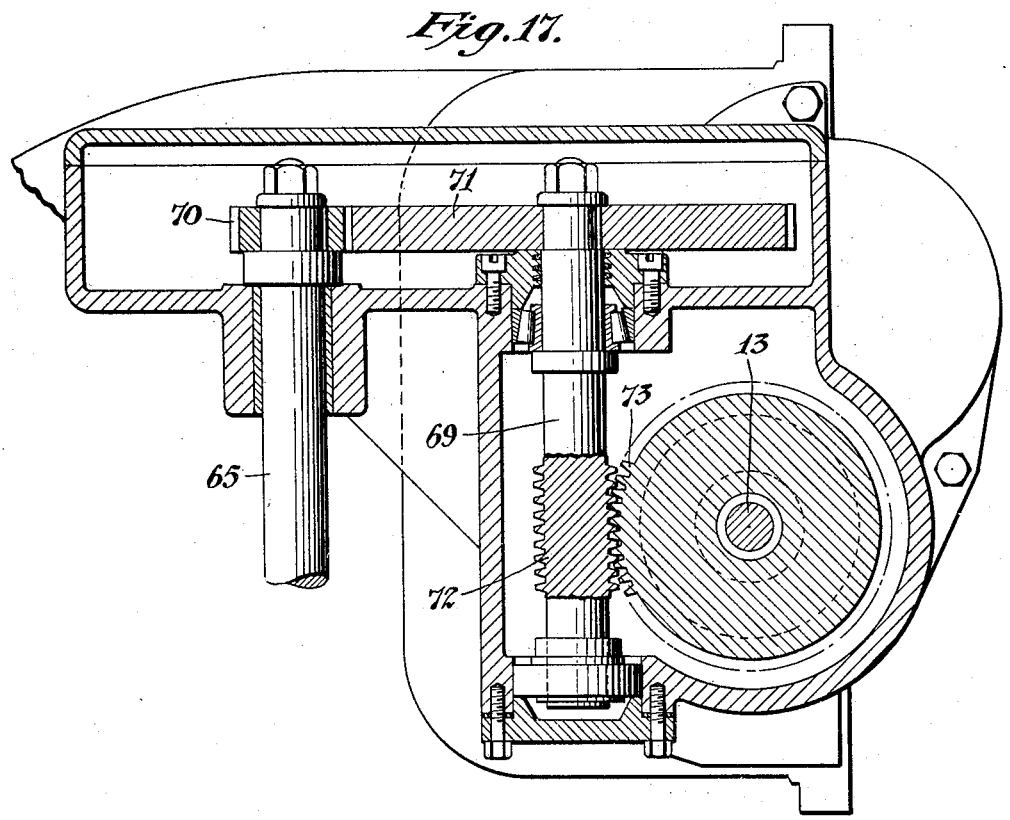

Nov. 10, 1931. E. L. FICKETT ET AL 1,830,753
GEAR CUTTING MACHINE
Filed Feb. 23, 1929 15 Sheets-Sheet 14
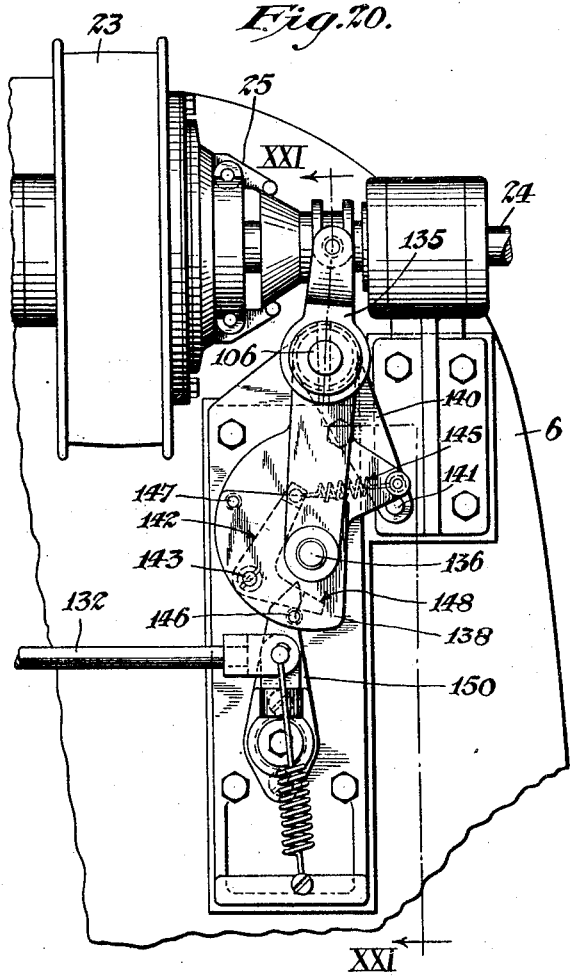
Inventors
Ernest L. Fickett, Linus E. Greene,
Vladimir Charushin, James S. Campbell
By their Attorney
Maurice B. Landes

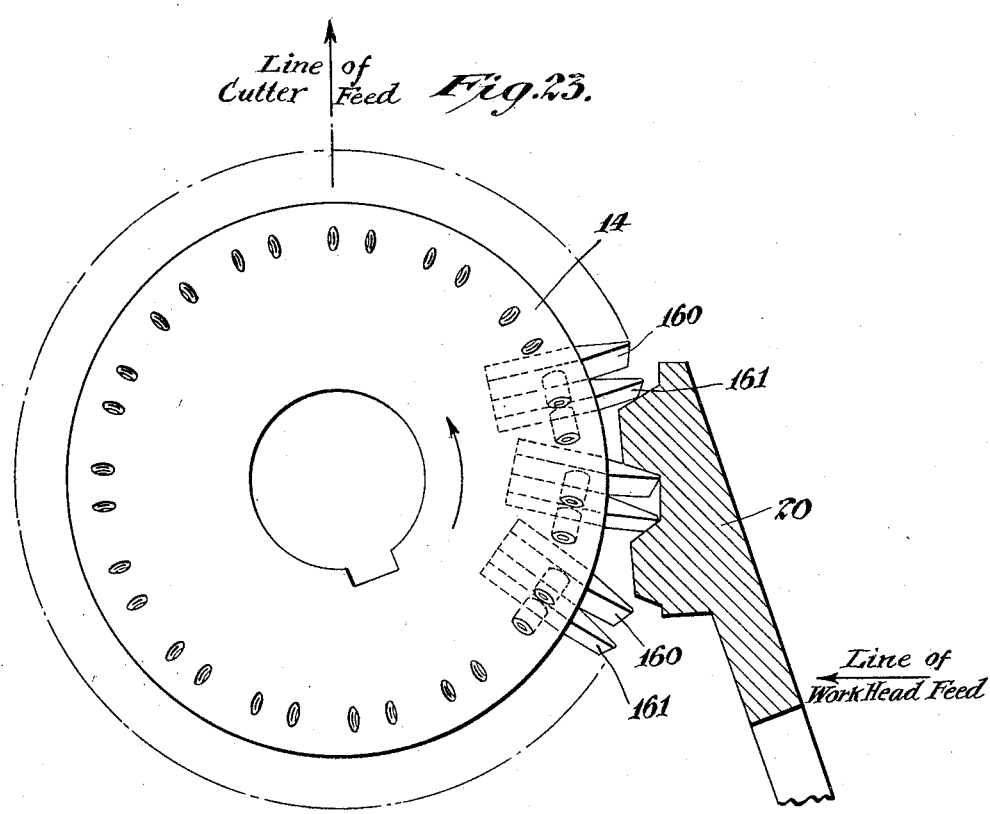
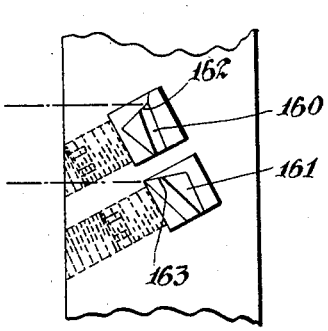
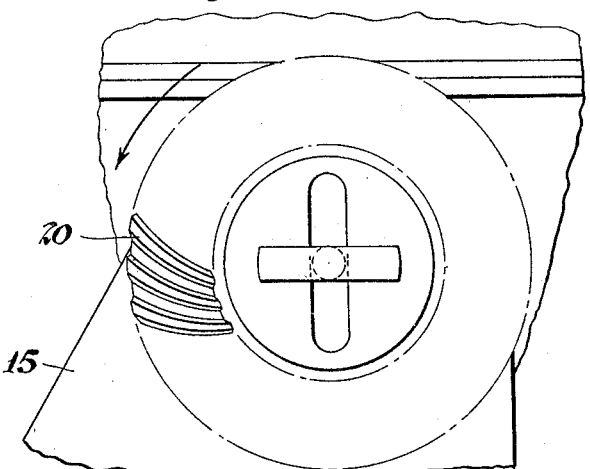
Inventors
Ernest L. Fickett, Linus E. Greene,
Vladimir Charushin, James S. Campbell
By their Attorney Patented Nov. 10, 1931

1,830,753

UNITED STATES PATENT OFFICE

ERNEST L. FICKETT, LINUS E. GREENE, VLADIMIR CHARUSHIN, AND JAMES S. CAMPBELL, OF FITCHBURG, MASSACHUSETTS, ASSIGNORS, BY MESNE ASSIGNMENTS, TO SCURLOCK GEAR CORPORATION, OF NEW YORK, N. Y., A CORPORATION OF NEW YORK

GEAR CUTTING MACHINE

Application filed February 23, 1929. Serial No. 342,206.

The present invention has for an object to provide an improved gear cutting machine.

The invention has been evolved in connection with the development of a machine for cutting spiral bevel gears and for convenience of disclosure this embodiment of the invention will be more particularly described to illustrate the principles of the invention but it will be understood that the particular description is illustrative merely and is not intended as defining the limits of the invention.

The nature and objects of the invention will be better understood from the description of a particular machine for the purposes of which description reference should be had to the accompanying drawings forming a part hereof and in which—

Figure 1 is a front elevation of the machine,

Figure 2 is a plan view thereof,

Figure 6:
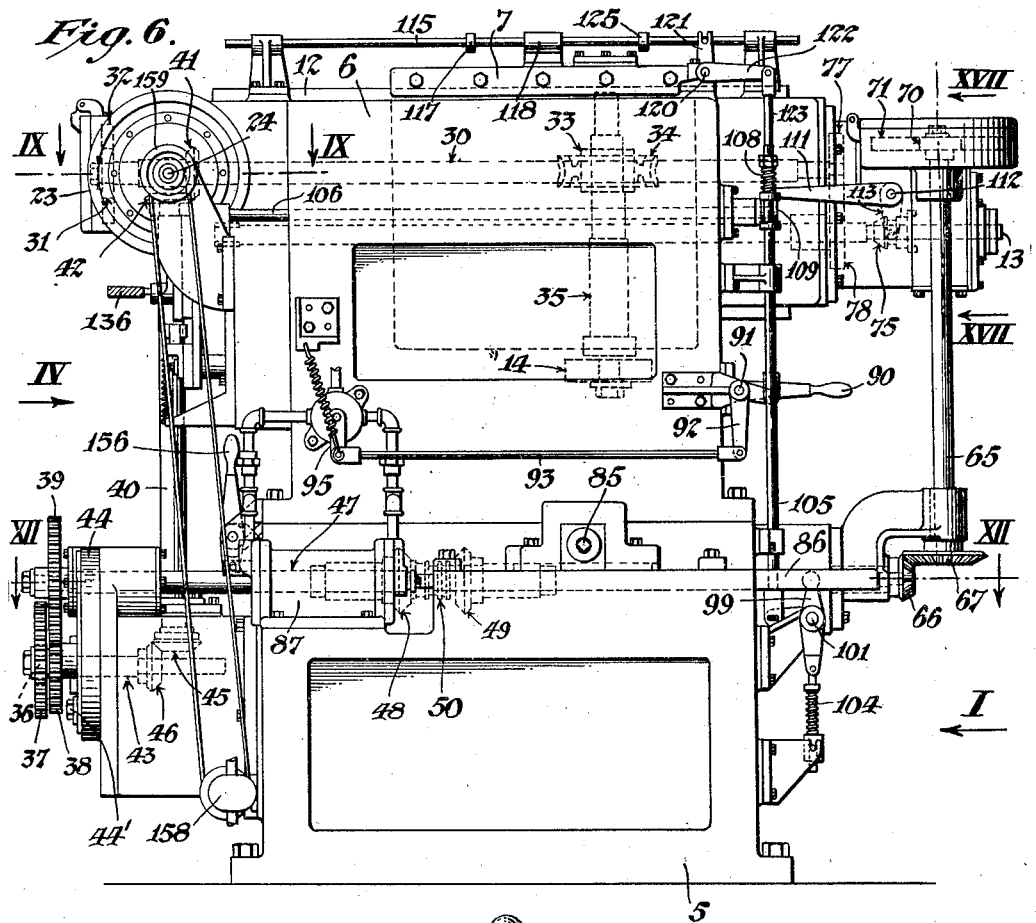
Figure 11:
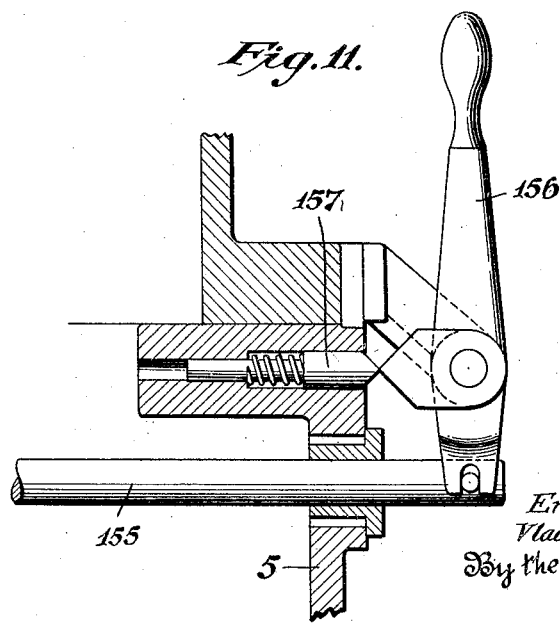
Figure 18:
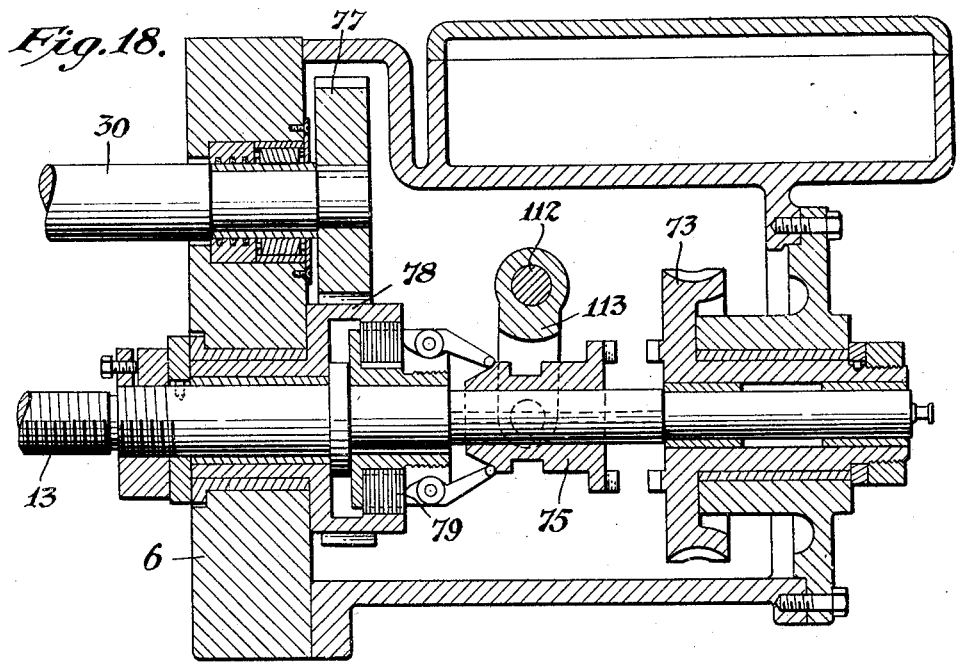
Figure 19:
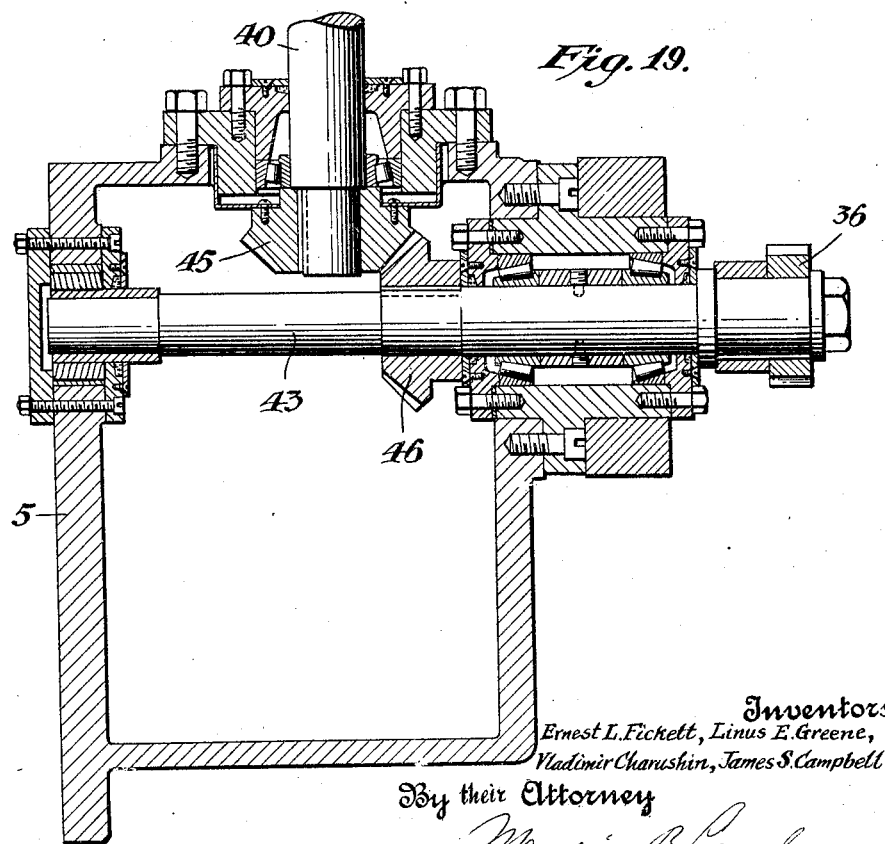

Figure 3 is a side elevation of the machine as viewed from the right of Figs. 1 and 2, as indicated by the arrows III in Figs. 1, 2 and 4, Figure 4 is a rear elevation of the machine as viewed from the direction of the arrows IV in Figs. 2 and 6, Figure 5 is an enlarged detail vertical section of the work supporting spindle taken on the line V—V of Fig. 3, Figure 6 is a side elevation of the machine as viewed from the left of Figs. 1 and 2, as indicated by the arrows VI in Figs. 1, 2 and 4, Figure 7 is an enlarged detail horizontal section of a change speed gearing taken on the line VII—VII of Fig. 4, Figure 8 is an enlarged detail horizontal section of a clamping arrangement taken on the line VIII—VIII of Fig. 4, Figure 9 is an enlarged detail horizontal section of the main clutch and associated gearing taken on the line IX—IX of Fig. 6, Figure 10 is an enlarged detail horizontal section of the work spindle driving mechanism taken on the line X—X of Fig. 3, Figure 11 is an enlarged detail vertical section of the work spindle reversing lever taken on the line XI—XI of Fig. 2, Figure 12 is an enlarged horizontal section of the work spindle reversing mechanism taken on the line XII—XII of Fig. 6, Figure 13 is a horizontal section of the cutter spindle driving gearing taken on the line XIII—XIII of Fig. 14, Figure 14 is an enlarged vertical detail section of the cutter spindle taken on the line XIV—XIV of Fig. 3, Figure 15 is an enlarged vertical detail section of the cutter spindle driving gearing taken on the line XV—XV of Fig. 4, Figure 16 is an enlarged vertical detail section of the work head cam operating cylinder taken on the line XVI—XVI of Fig. 2, Figure 17 is an enlarged vertical detail section of the cutter feed driving gearing taken on the line XVII—XVII of Figs. 2 and 6, Figure 18 is an enlarged detail vertical section of the cutter head feed drive taken on the line XVIII—XVIII of Fig. 2, Figure 19 is an enlarged detail vertical section of another part of the same gearing taken on the line XIX—XIX of Fig. 4, Figure 20 is an enlarged elevation of the main clutch operating mechanism shown in Fig. 4, Figure 21 is a section of the same taken on the line XXI—XXI of Fig. 20, Figure 22 is an enlarged detail plan view of the operative connections of the clutch operating mechanism, Figure 23 is a diagrammatic view showing the relative positions of the cutter head teeth and blank, Figure 24 is a face view of the blank mounted upon the work head, and Figure 25 is a detail elevation of a portion of the cutter shown in Fig. 23 as viewed towards the edge.

The gear cutting machine shown in the drawings comprises a base 5, a fixed transverse head 6, a movable cutter head 7 and a movable work head 9 slidable on ways 10 on said base. The cutter head 7 moves on the ways 12 under control of the feed screw 13 to carry the cutter 14 rearwardly during the cutting operation and again forwardly in an idle return movement. The work head 9 carries a saddle 15 which is adjustable about a vertical axis in an arcuate guide 17 to which said saddle is clamped in adjusted position by bolts 18. The saddle is shown as positioned at an angle of 90° to the length of the machine for convenience of disclosure but in cutting bevel gears, it will, of course, be adjusted to an oblique angle. The work spindle 19 is rotatable in the saddle 15 and carries a work blank 20 in position to be cut by the revolving cutter 14.

The machine operates to cut the completed gear in one continuous operation, during which the cutter and gear are continuously rotated and the cutter head is continuously fed all in suitably timed relation.

Power is supplied to the machine through a main pulley 23 which is connected to the main power shaft 24 by a main clutch 25. The mechanism for driving the cutter head from the main power shaft 24 may comprise the train of gearing indicated in Figs. 2, 3, 4, 6 and shown in detail in Figs. 9 and 14. This train of gearing comprises a counter shaft 26 driven by bevel gears 27, 28 from the drive shaft 24 and a transverse shaft 30 driven from the counter shaft by speed change gears 31, 32 which may be changed as desired to vary the speed of rotation of the cutter. The transverse shaft 30 is splined and carries a worm 33 splined thereto and meshing with a worm wheel 34 on the vertical cutter spindle 35.

The mechanism for rotating the work spindle in suitably timed relation to the rotation of the cutter head and to the speed of feed of the cutter spindle comprises a change speed gear train having gears 36, 37, 38, 39 indicated in Fig. 4 and shown in detail in Fig. 7, which gears may be changed to give any desired ratio between the cutter drive and the work blank drive. The gears are mounted on an adjustable frame 44 which is held in adjusted position by a clamp bolt 44'. This change speed gear train is driven from the transverse shaft 30 through a vertical shaft 40 by bevel gears 41, 42, the shaft 43 of the change speed gear train being driven by the bevel gears 45, 46. The transverse shaft 47 driven by said change speed gear train carries, as indicated in Figs. 2 and 12, a pair of bevel gears 48, 49 adapted to be clutched alternatively to the shaft 47 by the clutch 50 to drive the shaft 51 through the bevel gear 52. This shaft 51 extends beneath the work head 9 and has a bevel gear 54 splined thereon, said gear being carried by a bearing in the work head and meshing with a companion gear 55 on a vertical shaft 56 positioned centrally of the adjustably swiveled saddle 15. The work spindle 19 carries a worm wheel 58 in position to be driven by a worm 59 on said vertical shaft 56.

The mechanism for moving the cutter head carriage to feed the cutter across the face of the work and after a gear is cut to return it to initial position is connected to the driving mechanism of the cutter spindle and of the work spindle to operate in timed relation thereto. The train of gearing for operating the feed screw on the cutting stroke is connected to the transverse shaft 47 and comprises a vertical shaft 65 at the front of the machine driven through the bevel gears 66, 67 and a short vertical shaft 69 driven from the vertical shaft 65 by the change speed gears 70, 71, said short shaft carrying a worm 72 meshing with worm wheel 73 loose on the feed screw 13.

The above is shown in general arrangement in Fig. 1 and in plan in Fig. 2, the detail arrangement of which is shown in Figs. 17, 18. A clutch 75 connects the worm wheel 73 to the feed screw 13 during the cutting action.

A quick return movement of the cutter head is provided through gears 77, 78, the former of which is keyed to the cutter drive splined shaft 30 and the latter of which is loose on the feed screw 13 as shown in detail in Fig. 18. The gear 78 is connected during the return movement of the cutter head by a friction clutch 79 operated by the clutch member 75. As clearly shown in Fig. 18, the clutch member 75 is operable alternatively to connect the worm wheel 73 or the gear 78 to the feed screw and it may also rest in neutral position with both clutches open.

Control devices are provided whereby when a gear blank is placed on the work spindle 19 the main clutch 25 can be connected to start the machine, putting in operation the cutter spindle driving mechanism, the work spindle driving mechanism and the cutter head feed mechanism. The complete gear is cut during a single traverse of the cutter head. Preferably the control devices are arranged automatically to cause the work head to be retracted to move the completed gear out of the path of travel of the cutter after the cutting operation.

The work head 9 is moved on its way 10 toward and from the cutter head either manually by rotating the screw shaft 85 or by the cam 86 which is controlled by the air cylinder 87. Necessary adjustment when setting up the machine is made by manual rotation of this shaft but during the cutting operation the cam 86 is actuated by the air cylinder to draw the work head inward to working position for the cutting operation or to move it outward to cutter clearing position for the return movement of the cutter head. Air is admitted to the cylinder through the ports 88 and 89 at opposite ends of the cylinder as shown in Fig. 16.

The machine is started by moving the hand lever 90 at the front of the machine down to rotate the rock shaft 91 and through the arm 92 and connecting rod 93 at the side of the machine to throw the valve control lever 95 admitting air to the forward end of the cylinder 87. This moves the cam 86 rearwardly to draw the work head 9 into gear cutting position. The slide of the cam 86 carries at its forward end two slots 97 and 98, Fig. 2, in which engage arms 99, 100, Fig. 1, of rock shaft 101 and rock sleeve 102. The arm 99 is extended downwardly and operatively connected to an over-center spring 104 arranged to complete the movement of the rock shaft when it is moved beyond dead center position in either direction. The rocking of the sleeve 102 throws in the main clutch 25 to start the machine through the vertical rod 105 and rock shaft 106 extending transversely of the machine and connected to the clutch operating mechanism shown in detail in Figs. 20, 21. The connection between the vertical rod 105 and the rock shaft 106 comprises a lost motion spring 108 by which the arm 109 of the rock shaft 106 may be yieldingly moved to clutch engaging position. The rock shaft 101 is connected to control the feed screw reversing clutch 75 and when the machine is started causes said clutch to be moved into engagement with the worm wheel 73 to initiate the feeding of the cutter head 7. The operative connections between the rock shaft 101 and the clutch 75 are shown as comprising a vertical connecting rod 110 operating at its upper end an arm 111 on a rock shaft 112 which carries the clutch operating yoke 113 of the clutch 75.

When the operation of cutting the gear is completed which operation requires only one traverse of the cutter head, the cutter head feed mechanism is automatically reversed to return the cutter head to initial position.

When the cutter head is completely retracted to initial position the main clutch 25 is disconnected to stop the machine. The control mechanism for accomplishing these operations comprises a horizontal sliding rod 115 at the top of the machine above the cutter head and a similar sliding rod 116 beneath the cutter head. An adjustable stop 117 on the upper rod 115 is engaged by a projection 118 on the cutter head. Toward the forward end the rod is connected to rock a rock shaft 120 through an arm 121, which rock shaft in turn through an arm 122 moves the vertical connecting rod 123 upward to rock the rock shaft 91 and starting lever 90 upward. This operation through the connecting rod 93 and valve arm or lever 95 will admit air to the rearward end of the cylinder 87 to actuate the cam 86 and move the work head 9 away from the cutter head. This movement of the cam 86 forward will through the arms 99 and 100 rock the rock shaft 101 and the rock sleeve 102. As the rock shaft 101 is rocked, the clutch member 75 will be shifted through the connecting rod 110 and arm 111 to engage the friction clutch 79 thereby reversing the feed screw drive to return the cutter head to initial position. The movement of the rock shaft 102 and connections to the clutch mechanisms will not operate to actually disconnect the main clutch 25.

The slide rod 115 is provided with an additional stop 125 which will be engaged by the projection 118 if, because of accident or otherwise, the main clutch 25 is not disconnected when it ordinarily should be. In such event the continued movement of the cutter head will act through the stop 125 and the operating connections to the valve lever 95 to reverse the direction of feed of the cutter head.

A stop 127 is engaged by the cutter head and operates through suitable connections to reset mechanism for disconnecting the main clutch 25. Toward the opposite end of this rod 116 a stop 129 is arranged to be engaged at the end of the return movement of the cutter head to move the rod 116 in the opposite direction to cause actual operation of the previously set main clutch disconnecting mechanism. The connections between the rod 116 and the clutch 25 are best shown in Figs. 20, 21 and 22 in detail. The rod 116 is connected through gear segments 130 and 131 to a link 132, the movement of which to the right in Fig. 20 will, when the parts are suitably connected, throw out the clutch 25. In the clutch operating mechanism shown the clutch control arm or lever 135 is mounted to rock freely on the rock shaft 106. This arm projects downwardy and may be operated manually through the handle 136 which normally is spring pressed inwardly to engage in a socket 137 in the arm 138 which arm is also loosely mounted on the rock shaft 106 but may on occasion be connected to be actuated by said rock shaft 106. The rock shaft carries an arm 140 keyed thereto and having an outwardly projecting pin 141 engageable with a bell crank lever 142 pivoted at 143 to the arm 138.

The bell crank lever 142 is spring tensioned in one direction by a spring 145 and its motion in both directions relative to the arm 138 is limited by stop pins 146 and 147. When the rock shaft 106 is moved in a clockwise direction in Fig. 20 to start the machine, the projecting pin 141 of the arm 140 engages the bell crank lever or latch 142 and rocks the same about its pivot 143 causing a release between the lug 148 at the lower end of the bell crank lever and an operating arm 150, and then as the bell crank lever engages the stop pin 147 further movement of the rock shaft 106 causes actual engagement of the clutch 25.

As long as the cutting operation continues, the main clutch will be held in engagement by the rock shaft 106 because it in turn will be yieldably held in clutch engaging position by the connections to the cam 86 as previously described. However, after the work head has been retracted by the retraction of the cam 86 the rock shaft 106 will no longer hold the clutch in engagement. In fact, the arm 140 will be moved to the right in Fig. 20 leaving the clutch control lever free to be moved to clutch disengaging position. The movement of the rod 132 to the left in Fig. 20 will carry the arm 150 to which said rod 132 is operatively connected to the left and behind the lug 148 of the catch or bell crank lever 142 and the later movement of said rod 132 to the right, when the return movement of the cutter head is completed, will move the clutch control lever to clutch disengaging position.

The reversible driving mechanism for rotating the work spindle 19 is made reversible in order that right and left hand spiral bevel gears may be conveniently cut by reversing the direction of rotation of the blank. The clutch 50 is controlled by a clutch rod 155 arranged to be actuated by a hand lever 156 which is held in either extreme operated positioned by a spring detent 157, Fig. 11.

An oil pump 158 is shown connected to be driven from a pulley 159 on the main power shaft to supply oil to the work. The connections may be of any usual type and need not be specifically shown in the drawings.

The cutter may be of any preferred or suitable type. The preferred form of cutter is shown in Figs. 23 and 25. As there shown, the cutter comprises a head with a number of removable individual bits 160, 161 arranged in pairs, a pair of bits constituting in effect one tooth of a cutter and being arranged to operate in a corresponding space of the gear being cut, one bit working against one tooth face and the companion bit working against the opposite tooth face. The bits are so arranged that the cutting edges 162, 163 of the two bits are arranged in substantially the same plane in order that both faces of each spiral tooth as cut on the blank may be generated along an Archimedean spiral curve. This avoids the error ordinarily introduced by the thickness of the cutter tooth in the generation of the gear tooth.

The machine shown is used in cutting gears by a method wherein the blank and cutter are continuously rotated in suitably timed relation and the cutter and work are fed relatively to move the cutter across the face of the blank to form a gear in one continuous cutting operation.

We claim:—

1. A gear cutting machine comprising, in combination, a movable cutter head, a rotatable cutter carried thereby, an angularly adjustable work head movable toward and from the path of movement of said cutter head, means for so moving said work head as a necessary incident to the operation of the machine, a work support rotatable in said work head and means for rotating the cutter and the work support and feeding the cutter head in timed relation to cut a complete gear during one traverse of the cutter head.

2. A gear cutting machine comprising, in combination, a movable cutter head, a rotatable cutter carried thereby, a work head movable toward and from the path of movement of said cutter head, a work support rotatable in said work head, means for rotating the cutter and feeding the cutter head and means associated therewith for rotating the work head in either direction and in suitably timed relation to cut a gear.

3. A gear cutting machine comprising, in combination, a movable cutter head, a rotatable cutter carried thereby, a work head movable toward and from the path of movement of said cutter head, a work support rotatable in said work head, means for rotating the cutter and the work support and feeding the cutter head in timed relation to cut a complete gear during one traverse of the cutter head and control means operable to first move the work head toward the path of movement of the cutter and then to start the rotating and feeding means in operation.

4. A gear cutting machine comprising, in combination, a movable cutter head, a rotatable cutter carried thereby, a movable work head, a work support rotatable in said work head, a cam and means controlled thereby for moving the work head toward the path of movement of the cutter, driving mechanism for simultaneously rotating the cutter and work support and feeding the cutter head in suitably timed relation to cut a gear and means controlled by said cam for setting in operation the driving mechansm.

5. A gear cutting machine comprising, in combination, a movable cutter head, a rotatable cutter carried thereby, a work head movable toward and from the path of movement of said cutter head, a work support rotatable in said work head, driving means for rotating simultaneously the cutter and work support and feeding the cutter head to cut a gear, a cam for moving the work head, means controlled by movement of the cutter head to actuate said cam and means controlled by movement of the cam to reverse the direction of feed of the cutter head.

6. A gear cutting machine comprising, in combination, a movable cutter head, a flat rotatable cutter carried thereby, a work head movable toward and from the path of movement of said cutter head, a saddle adjustable angularly on said work head, a work support substantially in the plane of said cutter rotatable in said saddle and means for simultaneously rotating said cutter and work support and feeding said cutter head in suitably timed relation to cut a gear.

7. A machine for cutting spiral bevel gears comprising, in combination, a base, a cutter head movable transversely of said base, a cutter rotatable therein, a work head movable longitudinally of said base, a saddle adjustable angularly on said work head, a work support rotatable in said saddle, driving means for simultaneously rotating said cutter and work support including a shaft extending longitudinally of the base, and a gear splined on said shaft and carried by said work head.

8. A gear cutting machine, as defined in claim 7, wherein means is provided for driving the work support in either direction whereby to cut right or left spiral gears.

9. A machine for cutting spiral bevel gears comprising, in combination, a base, a cutter head movable transversely of said base, a cutter rotatable therein, a work head movable longitudinally of said base, a saddle adjustable angularly on said work head, a work support rotatable in said saddle, driving means for simultaneously rotating said cutter and work support including a shaft extending longitudinally of the base, a gear splined on said shaft and carried by said work head, and a shaft coaxial with the angularly adjustable saddle driven by said gear.

10. In a machine for cutting bevel gears, in combination, a rotatable work supporting spindle, a cutter head movable on ways at a right angle to the normal axis of said spindle, a cutter having a plurality of circumferentially arranged teeth, means for moving said cutter head along said ways during the gear cutting operation and for rotating said cutter in said cutter head to bring a plurality of teeth simultaneously into action on a blank carried by said spindle.

11. A gear cutting machine comprising, in combination, a slidable cutter head, a rotatable cutter carried by said head, a work head movable toward and from the cutter head, a saddle adjustable angularly on said work head, a work support rotatable in said saddle and driving means for rotating said work support, comprising a shaft coaxial with the axis of adjustment of the saddle.

12. A gear cutting machine comprising, in combination, a cutter head, a work head movable toward and from the cutter head, a work support rotatable in said work head, and means for simultaneously rotating said cutter and said work support including means for reversing the direction of rotation of the work support to cut right or left hand spiral gears.

13. A gear cutting machine comprising, in combination, a movable cutter head, a rotatable cutter carried thereby, a work head movable toward and from the path of movement of said cutter head, a work support rotatable in said work head and means for rotating the cutter and the work support simultaneously including adjustable change speed gearing adapted to readily vary the relative speeds of the cutter and work support.

14. A gear cutting machine comprising, in combination, a movable cutter head, a rotatable cutter carried thereby, a work head movable toward and from the path of movement of said cutter head, a work support rotatable in said work head and means for simultaneously rotating the cutter and work support and feeding the cutter head comprising adjustable change gears for readily varying the relative rates of rotation of the cutter and work support and for varying the feed of the cutter head.

15. A gear cutting machine comprising, in combination, a movable cutter head, a rotatable cutter carried thereby, a work head movable toward and from the path of movement of said cutter head, a work support rotatable in said work head, driving means for simultaneously rotating the cutter and work support and feeding the cutter head to cut a gear and control means comprising a cam connected to the work head to move it toward and from the cutter head, and means controlled by said cam in its different positions to start the driving means and to reverse the direction of feed of the cutter head.

16. A gear cutting machine comprising, in combination, a movable cutter head, a rotatable cutter carried thereby, a work head movable toward and from the path of movement of said cutter head, a work support rotatable in said work head, a main power shaft, a clutch for connecting the power shaft to a source of power, gearing including change gears connected to said main power shaft for rotating the cutter and work support and for feeding the cutter head and means for disconnecting said clutch comprising a device placed under tension by movement of the cutter head in one direction and tripped to disconnect the clutch by movement of the cutter head in the opposite direction.

17. A machine for cutting spiral bevel gears comprising, in combination, a base having transverse and longitudinal ways, a cutter head movable on said transverse ways, a work head movable on said longitudinal ways, a cutter spindle rotatable in said cutter head, a work support rotatable in said work head, driving means for simultaneously rotating said cutter spindle and work support, a cam movable transversely of the base, an adjustable connection between the cam and the work head whereby movement of the cam will move the work head toward and from the cutter head and means controlled by the cam for setting in operation the driving means.

18. A gear cutting machine comprising, in combination, a movable cutter head, a rotatable cutter carried thereby, a work head movable toward and from the path of movement of said cutter head, a work support rotatable in said work head, driving means for rotating simultaneously the cutter and work support and feeding the cutter head to cut a gear, a cam for moving the work head, means controlled by movement of the cutter head to actuate said cam, means controlled by movement of the cam to reverse the direction of feed of the cutter head and means controlled by movement of the cutter head to stop the driving means.

19. In a machine of the class described a rotatable work supporting spindle, a cutter carriage, a circular cutter having a plurality of pairs of cutting means arranged circumferentially about its edge, means for shifting said carriage to carry said cutter across the face of the work, and means for simultaneously rotating said spindle and cutter to cut a complete gear during a single shifting of said carriage across the work.

20. In a machine of the class described a rotatable work supporting spindle, a rotatable circular cutter having a plurality of pairs of cutting means arranged circumferentially about its edge, means for producing a relative transverse movement between said spindle and cutter to carry the cutter relatively across the face of the work, and means for simultaneously rotating said spindle and cutter to cut a complete gear during a single relative transverse movement between said spindle and cutter.

21. In a machine of the class described a rotatable work supporting spindle, a rotatable cutter having a plurality of pairs of removable bits arranged about its entire circumference, means for producing relative rectilinear movement between said cutter and spindle, and means for simultaneously rotating said cutter and spindle during such relative rectilinear movement to cut a gear, the separate bits of each pair cutting opposite sides of the teeth formed on the work.

22. In a machine of the class described a rotatable work supporting spindle, a rotatable cutter having a plurality of removable bits arranged about its circumference, said bits being arranged in pairs which co-operate with adjacent tooth faces, means for producing relative rectilinear movement between said cutter and spindle, and means for simultaneously rotating said cutter and spindle during such relative rectilinear movement to cut a gear.

23. In a machine of the class described a work supporting spindle, a cutter having a plurality of cutting elements arranged in pairs about its circumference, and means for simultaneously rotating said spindle and cutter and producing relative transverse movement therebetween to cut a complete gear during a single relative transverse movement, the cutting elements of a pair co-operating with adjacent tooth faces during the cutting operation.

24. In a machine of the class described a work supporting spindle, a cutter, means for simultaneously rotating said spindle and cutter and producing relative transverse movement therebetween, and means operable at will for predetermining the direction of rotation of said spindle.

25. In a machine of the class described a work supporting spindle, a cutter, means for simultaneously rotating said spindle and cutter and producing relative transverse movement therebetween, and means for predetermining the direction of rotation of said spindle to cut either right or left-hand spiral teeth at will, said cutter forming a complete gear during a single relative transverse movement between said spindle and cutter.

26. In a machine of the class described a normally retracted work supporting spindle, a rotatable cutter, means for simultaneously shifting said spindle into active position and controlling the operation of the machine, means for producing relative transverse movement between said spindle and cutter, means for simultaneously rotating said spindle and cutter to form a complete gear during relative transverse movement in one direction, and means controlled by said relative movement for causing said first mentioned means to withdraw said spindle to permit a return relative movement between said spindle and cutter out of co-operation.

27. In a machine of the class described a work supporting member, a cutter, means for producing relative reciprocatory movements between said member and cutter, said member and cutter being normally out of cooperative relation, means for causing operation of said machine and simultaneously bringing said member and cutter into cooperative relation, and means controlled by the relative movement between said member and cutter for causing said cutter and member to be thrown out of co-operative relation.

28. In a machine of the class described a work supporting member, a cutter, means for producing relative reciprocatory movements between said member and cutter, said member and cutter being normally out of co-operative relation, means for causing operation of said machine, and simultaneously bringing said member and cutter into cooperative relation, means controlled by the relative movement between said member and cutter in one direction for causing said cutter and member to be thrown out of co-operative relation, and means controlled by relative movement between said member and cutter in the opposite direction for arresting the operation of the machine.

29. In a machine of the class described a work supporting spindle, a cutter, means for shifting said spindle to carry the work into co-operative relation with the cutter, means controlled by said first mentioned means for producing a relative reciprocatory movement between said spindle and cutter, said movement in one direction aiding in the cutting action, and means controlled by said movement for causing said first mentioned means to carry the work out of co-operative relation with the cutter.

30. In a machine of the class described a support for a work blank, a cutter, operating means for rotating and bodily shifting said cutter to form gear teeth on said blank, means for starting said operating means and means for automatically stopping said operating means only after a complete gear is cut and the cutter is restored to its initial starting point.

31. In a machine of the class described a support for a work blank, a cutter, operating means for rotating and bodily shifting said cutter to form gear teeth on said blank, means for starting said operating means and means for automatically stopping said operating means when a complete gear is cut, said last recited means being nearly conditioned for operation upon completion of the gear and being operated to arrest the machine when the cutter is returned to normal.

32. In a machine of the class described a support for a work blank, a cutter, means for producing relative transverse reciprocatory movements between said support and cutter, operating means for causing said cutter to form a complete gear out of said blank during a single relative transverse movement between said support and cutter, and means for automatically arresting said operating means only after the gear is completely cut and the cutter and said support are restored to their initial relative positions.

33. In a machine of the class described a support for a work blank, a cutter, means for producing relative transverse reciprocatory movements between said support and cutter, operating means for causing said cutter to form a complete gear out of said blank during relative transverse movement between said support and cutter in one direction, and means merely conditioned during said cutting movement for arresting operation of the machine, said conditioned means being operated upon the return relative movement between said support and cutter to arrest operation of the machine.

34. In a machine of the class described a support for a work blank, a cutter, means for producing relative transverse reciprocatory movements between said support and cutter, operating means for causing said cutter to form a complete gear out of said blank during relative transverse movement between said support and cutter in one direction, means for holding said operating means active during such movement, means operable at the end of said movement for releasing said holding means and causing reverse relative movement between the support and cutter, and means operated upon said reverse movement for arresting said operating means.

35. In a machine of the class described a work supporting spindle, a rotatable cutter, means for producing relative reciprocatory movements between said spindle and cutter, means for simultaneously rotating said cutter to form a complete gear out of the work supported by said spindle, and means for automatically arresting rotation of said cutter only after said gear is completed and said cutter and spindle are restored to their initial positions.

36. In a machine of the class described a spindle for supporting a gear blank, a cutter, means for producing relative transverse and rotational movements between said spindle and cutter, and means controlled by the relative transverse movements for arresting the relative rotational movements, said last mentioned means requiring relative transverse movements in both direction to arrest said rotational movements.

37. In a machine of the class described a main operating mechanism, manual means for controlling said mechanism, a cutter carriage adapted to be reciprocated by said mechanism, a clutch for controlling the forward and return movements of said carriage, and means controlled by said manual means for operating the clutch to initiate the forward movement of said carriage, said clutch being shifted under control of said carriage to cause a return movement of the latter.

38. In a machine of the class described a main operating mechanism, manual means for controlling said mechanism, a cutter carriage adapted to be reciprocated by said mechanism, means controlled by said manual means for initiating the forward movement of said carriage, and means controlled by said carriage for causing its return.

39. In a machine of the class described a main operating mechanism, manual means for controlling said mechanism, a cutter carriage adapted to be reciprocated by said mechanism, means controlled by said manual means for initiating the forward movement of said carriage, means controlled by said carriage for causing its return, and means controlled by said carriage only upon its return to arrest said operating mechanism.

40. In a machine of the class described, a rotatable work supporting spindle, a cutter adapted to cooperate with the work thereon, means for adjusting said spindle angularly with respect to said cutter, and means for moving said spindle longitudinally to carry the work into and out of the path of said cutter at the beginning of an operation of the machine and upon completion of the cutting of the gear, respectively.

In testimony whereof, we have signed our names to this specification this 31st day of January, 1929.

ERNEST L. FICKETT.
LINUS E. GREENE.
VLADIMIR CHARUSHIN.
JAMES S. CAMPBELL.